US008369442B2

(12) United States Patent  (10) Patent No.: US 8,369,442 B2
Vassilieva et al.  (45) Date of Patent: Feb. 5, 2013

(54) COMMUNICATING A SIGNAL ACCORDING TO ASK MODULATION AND PSK MODULATION

(75) Inventors: Olga I. Vassilieva, Plano, TX (US); Takao Naito, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 1383 days.

(21) Appl. No.: 11/622,495

(22) Filed: Jan. 12, 2007

(65) Prior Publication Data

US 2008/0170639 A1  Jul. 17, 2008

(51) Int. Cl.
*H04L 27/10* (2006.01)
*H04J 1/00* (2006.01)
(52) U.S. Cl. ......... 375/272; 342/70; 342/137; 342/361; 370/206; 375/279; 375/295; 375/300; 398/65; 398/188
(58) Field of Classification Search ............ 342/70, 342/137, 361; 370/206; 375/272, 279, 295, 375/300; 398/65, 188
See application file for complete search history.

(56) References Cited

U.S. PATENT DOCUMENTS

| | | | | |
|---|---|---|---|---|
| 6,310,709 | B1 * | 10/2001 | Bergano | 398/185 |
| 6,417,957 | B1 * | 7/2002 | Yao | 359/334 |
| 6,576,886 | B1 * | 6/2003 | Yao | 250/225 |
| 7,023,602 | B2 * | 4/2006 | Aastuen et al. | 359/247 |
| 7,024,123 | B2 * | 4/2006 | Yano | 398/184 |
| 7,067,795 | B1 * | 6/2006 | Yan et al. | 250/225 |
| 7,158,077 | B2 * | 1/2007 | Brosche | 342/137 |
| 7,298,789 | B2 * | 11/2007 | Kubo et al. | 375/279 |
| 7,428,043 | B2 * | 9/2008 | Boehm et al. | 356/218 |
| 7,672,598 | B1 * | 3/2010 | Campillo | 398/184 |
| 2004/0090361 | A1 * | 5/2004 | Brosche | 342/70 |
| 2004/0184556 | A1 * | 9/2004 | Kubo et al. | 375/295 |
| 2005/0100347 | A1 * | 5/2005 | Yano | 398/188 |
| 2005/0179905 | A1 * | 8/2005 | Ohtake et al. | 356/450 |
| 2005/0254060 | A1 * | 11/2005 | Alphonse | 356/479 |
| 2007/0146721 | A1 * | 6/2007 | Barcelos et al. | 356/477 |

OTHER PUBLICATIONS

Ohm, Michael, et al., *"Quaternary Optical ASK-DPSK and Receivers With Direct Detection"*, IEEE Photonics Technology Letters, vol. 15, No. 1, pp. 159-161, Jan. 2003.
Zhu, Y., et al., *"1.6 bit/s/Hz orthogonally polarized CSRZ—DQPSK transmission of 8×40 Gbit/s over 320 km NDSF"*, Optical Society of America, 3 pages, 2004.
Kikuchi, Nobuhiko, et al., *"Study on Cross-Phase Modulation (XPM) Effect on Amplitude and Differentially Phase-Modulated Multilevel Signals in DWDM Transmission"*, IEEE Photonics Technology Letters, vol. 17, No. 7, pp. 1549-1551, Jul. 2005.
Tokle, Torger, et al., *"Penalty-free Transmission of Multilevel 240 Gbit/s RZ-DQPSK-ASK using only 40 Gbit/s Equipment"*, Conference Paper, 31st European Conference on Optical Communication, ECOC 2005, 2 pages, Sep. 2005.

* cited by examiner

Primary Examiner — Erin File
(74) Attorney, Agent, or Firm — Baker Botts L.L.P.

(57) ABSTRACT

A transmitter modulator that is operable to modulate signals according to multiple modulation formats includes a first modulator, a second modulator, and a polarization beam combiner. The first modulator encodes a first signal according to a first modulation format. The second modulator encodes a second signal according to a second modulation format, the first signal orthogonally polarized with respect to the second signal. The polarization beam combiner combines the first signal and the second signal for transmission.

17 Claims, 4 Drawing Sheets

COMMUNICATING A SIGNAL ACCORDING TO ASK MODULATION AND PSK MODULATION

TECHNICAL FIELD

This invention relates generally to the field of signal communication and more specifically to communicating a signal according to ASK modulation and PSK modulation.

BACKGROUND

Signals may be modulated using phase-shift keying (PSK) and amplitude-shift keying (ASK) modulation. In PSK modulation, changes in the phase of a signal are used to represent data, and in ASK modulation, the amplitude levels of a signal are used to represent data.

PSK-ASK communication, however, may experience difficulties. As an example, PSK-ASK communication typically uses a non-optimal extinction ratio. An extinction ratio refers to the ratio of the optical power of a "1" pulse to that of a "0" pulse. In general, a higher ASK extinction ratio improves ASK communication, but degrades PSK communication. For example, ASK communication may be optimal at an extinction ratio of 10 decibels, but PSK communication may not be optimal. Typically, a compromise extinction ratio between the optimal extinction ratio for ASK communication and the optimal extinction ratio for PSK communication is used. For example, an extinction ratio of 7 decibels may be used. The compromise extinction ratio, however, is typically not optimal for either ASK or PSK communication.

As another example, PSK-ASK communication may suffer from crosstalk between the ASK and PSK signals. The ASK signal may induce a non-linear phase shift on the PSK signal. The non-linear phase shift introduces non-linear phase noise to the PSK signal, degrading the PSK signal. In addition, self-phase modulation may induce a phase shift that introduces a frequency chirp, which may degrade the ASK signal.

SUMMARY OF THE DISCLOSURE

In accordance with the present invention, disadvantages and problems associated with previous techniques for communicating a signal according to ASK modulation and PSK modulation may be reduced or eliminated.

According to one embodiment of the present invention, a transmitter modulator that is operable to modulate signals according to multiple modulation formats includes a first modulator, a second modulator, and a polarization beam combiner. The first modulator encodes a first signal according to a first modulation format. The second modulator encodes a second signal according to a second modulation format, the first signal orthogonally polarized with respect to the second signal. The polarization beam combiner combines the first signal and the second signal for transmission.

According to one embodiment of the present invention, a receiver demodulator that is operable to demodulate a signal modulated according to multiple modulation formats includes a polarization beam splitter, a first demodulator, and a second demodulator. The polarization beam splitter splits a signal to yield a first signal and a second signal. The first signal is encoded according to a first modulation format, and the second signal is encoded according to a second modulation format. The first signal is orthogonally polarized with respect to the second signal. The first demodulator decodes the first signal according to the first modulation format. The second demodulator decodes the second signal according to the second modulation format.

Certain embodiments of the invention may provide one or more technical advantages. A technical advantage of one embodiment may be that a transmitter may modulate a first signal using a first modulation format and a second signal using a second modulation format, where the first signal is orthogonally polarized with respect to the second signal. The signals may then be combined for transmission. Encoding orthogonally polarized signals using different modulation formats may reduce crosstalk between the resulting encoded signals, and may also reduce dependence of the extinction ratio of one modulation format on the extinction ratio of the other modulation format.

Another technical advantage of one embodiment may be that the first modulation format may refer to PSK modulation, and the second modulation format may refer to ASK modulation. Accordingly, difficulties associated with PSK-ASK communication may be reduced.

Another technical advantage of one embodiment may be that a receiver may include a polarization controller monitor that monitors polarization settings of the polarization controller. In the embodiment, the polarization controller monitor may measure a power level of one of the signals. If the measured power is less than an expected power, the polarization angle of the received signal may be adjusted.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 6 of the drawings, like numerals being used for like and corresponding parts of the various drawings.

Figure 1:
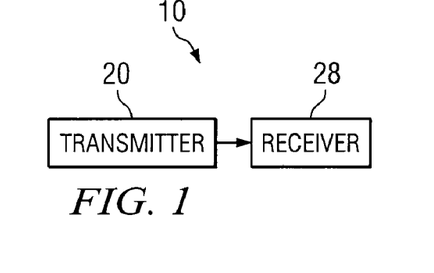
FIG. 1 illustrates one embodiment of a system for communicating a signal according to amplitude-shift keying (ASK) and phase-shift keying (PSK) modulation.

FIG. 1 illustrates one embodiment of a system 10 for communicating a signal according to amplitude-shift keying (ASK) and phase-shift keying (PSK) modulation. According to the embodiment, a transmitter may modulate a first signal according to a first modulation format and a second signal according to a second modulation format, where the first signal is orthogonally polarized with respect to the second signal. In one embodiment, the first modulation format may refer to PSK modulation and the second modulation format may refer to ASK modulation. The signals may then be combined for transmission. Encoding orthogonally polarized signals according to different modulation formats may reduce crosstalk between the resulting encoded signals, and may also reduce dependence of the extinction ratio of one modulation format on the extinction ratio of the other modulation format.

According to one embodiment, system 10 communicates signals. A signal may refer to an optical signal transmitted as light pulses. An optical signal may have a frequency of approximately 1550 nanometers, and a data rate of, for example, 10, 20, 40, or over 40 gigabits per second. A signal may communicate any suitable information such as voice, data, audio, video, multimedia, other information, or any combination of the preceding.

System 10 includes devices that may have components operable to perform the operations of the device. For example, a device may comprise logic, an interface, a memory, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may receive input, send output, perform suitable processing of the input or output or both, or any combination of the preceding, and may comprise one or more ports, conversion software, or both. "Memory" may store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

According to the illustrated embodiment, system 10 includes a transmitter 20 operable to communicate a signal to a receiver 28. Transmitter 20 and receiver 28 may communicate according to multiple modulation formats. A modulation format may refer to technique for modulating a signal in a particular manner to encode data into the signal. Examples of modulation formats include PSK and ASK modulation.

According to one embodiment, PSK modulation may refer to differential PSK (DPSK) modulation. In DPSK modulation, phase shifts between successive bits represent bits. According to n-phase-shift keying (n-PSK) modulation, n different phase shifts may be used to encode p bits per symbol, where $n=2^p$. For example, differential binary PSK (DBPSK) uses two phase shifts to encode one bit per symbol, and differential quadrature PSK (DQPSK) uses four phase shifts to encode two bits per symbol.

In ASK modulation, amplitude levels represent bits. According to n-level amplitude-shift keying (n-level ASK) modulation, n different amplitude shifts may be used to encode p bits per symbol, where $n=2^p$. For example, 2-level ASK uses two amplitude shifts to encode one bit per symbol, and 4-level ASK uses four amplitude shifts to encode two bits per symbol.

According to one embodiment, transmitter 20 modulates a signal according to PSK and ASK modulation to encode data in a PSK-ASK signal. Receiver 28 demodulates the PSK-ASK signal according to PSK and ASK modulation to decode the data encoded in the signal. Transmitter 20 and receiver 28 may perform PSK and ASK modulation and demodulation as described with reference to FIG. 2.

Figure 2:
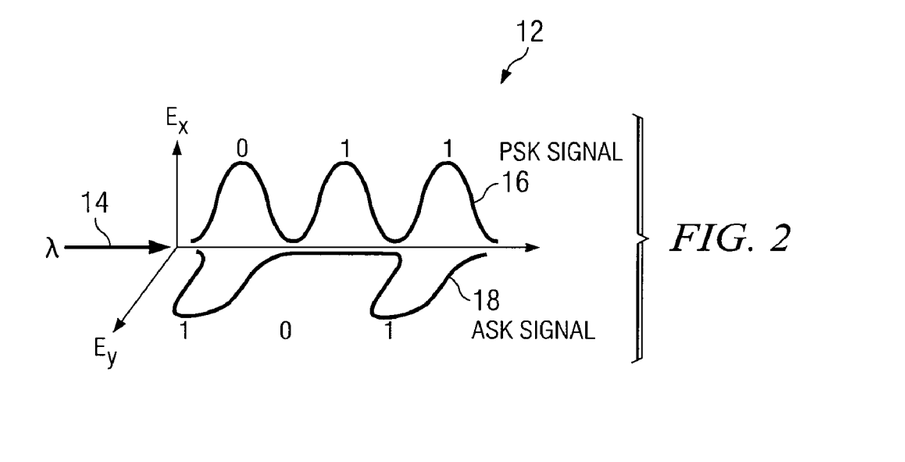
FIG. 2 illustrates an example of PSK and ASK modulation of a signal that may be performed by the system of FIG. 1.

FIG. 2 illustrates an example of PSK and ASK modulation of a signal that may be performed by system 10 of FIG. 1. Diagram 12 illustrates a signal encoded according to PSK an ASK modulation. In the example, a signal 14 with a wavelength λ is split into orthogonally polarized signals 16 and 18. Signal 16 is encoded according to PSK modulation, and signal 18 is encoded according to ASK modulation.

Encoding orthogonally polarized signals 16 and 18 with different modulation formats may reduce certain problems associated with multiple modulation format communication. As an example, signals 16 and 18 are separated by orthogonal polarization, so PSK modulation does not pose a limitation on the extinction ratio of ASK modulation. As another example, since signals 16 and 18 are separated by orthogonal polarization, cross talk between the signals may be reduced. As another example, the monitor at the receiver side may determine whether to adjust the polarization of the received signal by measuring the power level of one signals 16 or 18.

Figure 3:
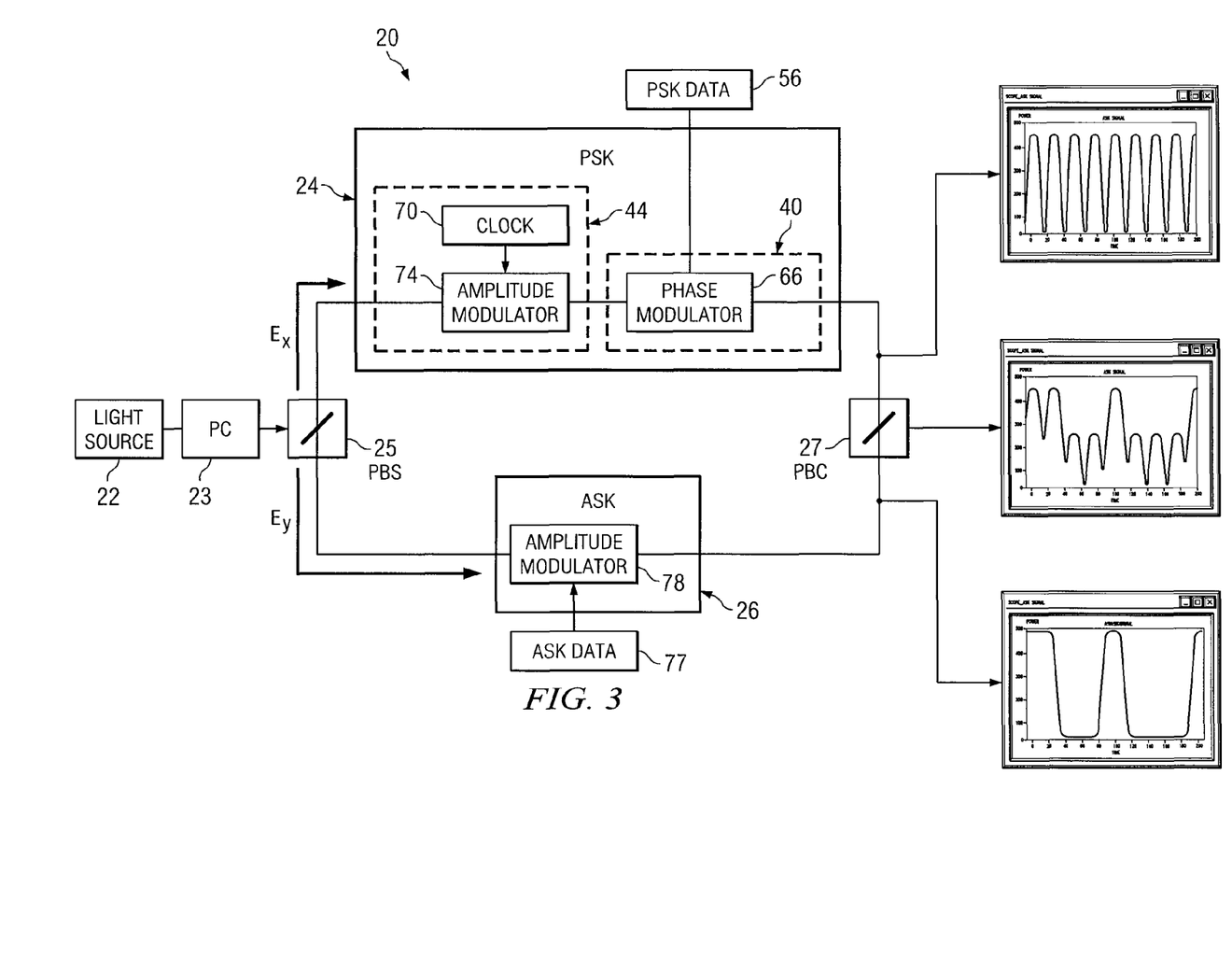
FIG. 3 illustrates one embodiment of a transmitter that may be used with the system of FIG. 1.

FIG. 3 illustrates one embodiment of a transmitter 20 that may be used with system 10 of FIG. 1. Transmitter 20 may include one or more suitable components operable to modulate a signal according to PSK modulation and ASK modulation. According to the illustrated embodiment, transmitter 20 includes a light source 22, a polarization controller 23, a polarization beam splitter (PBS) 25, a PSK modulator 24, an ASK modulator 26, and a polarization beam combiner (PBC) 27 coupled as shown.

According to the embodiment, light source 22 emits a light beam that may be encoded with bits to yield a signal that communicates information. Light source 22 may emit a continuous wave light beam that may be split into one or more signals for encoding.

Polarization controller 23 polarizes the signal from light source 22 to yield orthogonal signal components. Polarization controller 23 may have any suitable setting to yield orthogonal signal components. For example, the polarization controller may be set to approximately 45 degrees.

Polarization beam splitter (PBS) 25 splits the signal to yield signals orthogonally polarized at 90 degrees with respect to each other, each signal to be modulated according to a particular modulation format. In the illustrated embodiment, polarization beam splitter 25 splits the signal to yield a signal for ASK modulation and a signal for PSK modulation. The signal may be split in any suitable manner. According to one embodiment, the signal is split into orthogonal signal components $E_x$ and $E_y$. Component $E_x$ is used as the signal for PSK modulation, and component $E_y$ is used as the signal for ASK modulation.

PSK modulator 24 modulates a signal according to PSK modulation to yield a PSK encoded signal. According to the illustrated embodiment, PSK modulator 24 may include a PSK module 40 and a return-to-zero (RZ) module 44 coupled as shown. According to one embodiment, PSK module 40 may include one or more PSK data encoders. Each PSK data encoder encodes particular PSK data 56 into a signal, which may be split from a signal received by PSK modulator 24. A PSK data encoder may include a phase modulator 66 that modulates the phase of a signal according to PSK data 56 in order to encode PSK data 56 into the signal.

RZ module 44 modulates the PSK signal according to RZ modulation to return the amplitude of the signal to zero between each pulse. RZ module 44 may include a clock 70 and an amplitude modulator 74. Amplitude modulator 74 modulates the PSK signal according to the clock signal received from clock 70. Amplitude modulator 74 may represent any suitable amplitude modulator. In general, examples of an amplitude modulator include an intensity modulator such as a Mach-Zehnder modulator.

ASK modulator 26 modulates a signal according to ASK modulation to yield an ASK encoded signal. ASK modulator 26 may include one or more ASK data encoders. Each ASK data encoder encodes particular ASK data 77 into a signal. An ASK data encoder may include an amplitude modulator 78 operable to modulate the amplitude of the signal according to ASK data 77 to encode ASK data 77 into the signal.

Polarization beam combiner (PBC) 27 combines the ASK and PSK signals to yield a PSK-ASK signal for transmission to receiver 28.

Modifications, additions, or omissions may be made to transmitter 20 without departing from the scope of the invention. The components transmitter 20 may be integrated or separated according to particular needs. Moreover, the operations of transmitter 20 may be performed by more, fewer, or other components. Additionally, operations of transmitter 20 may be performed using any suitable logic. As used in this document, "each" refers to each member of a set or each member of a subset of a set.

Figure 4:
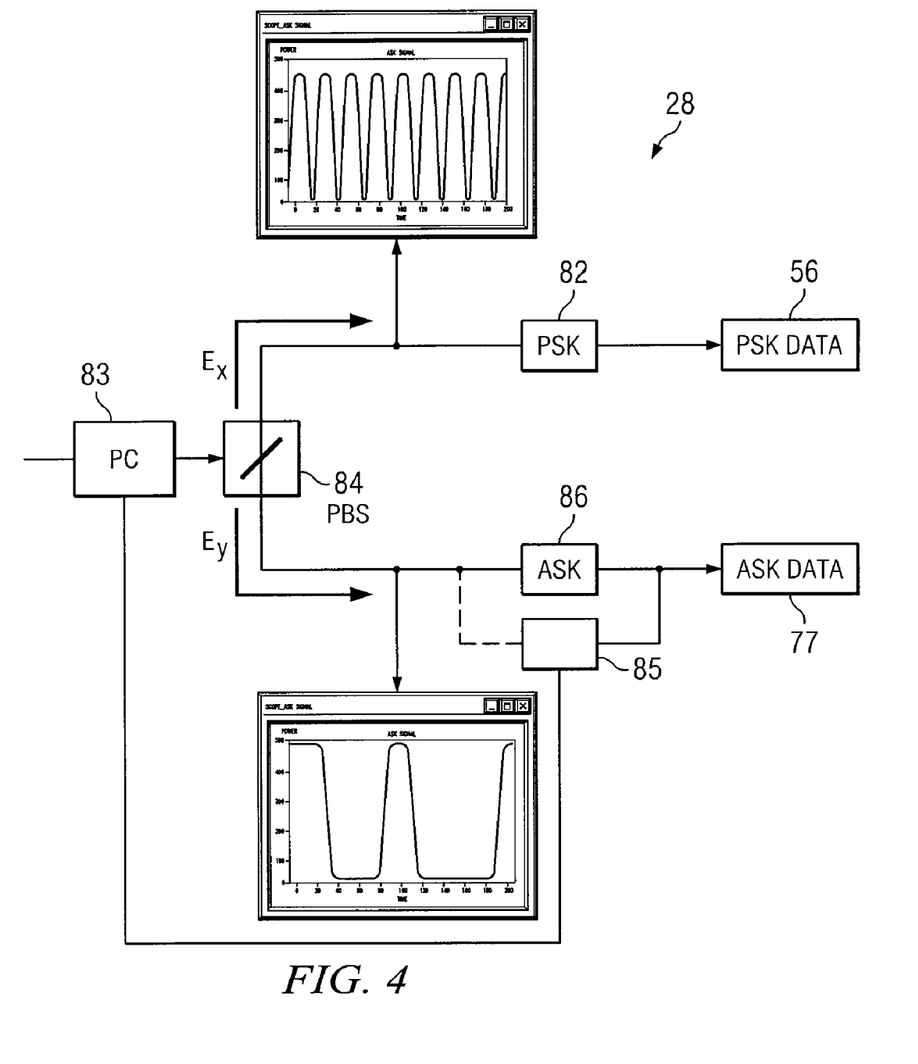
FIG. 4 illustrates one embodiment of a receiver that may be used with the system of FIG. 1.

FIG. 4 illustrates one embodiment of a receiver 28 that may be used with system 10 of FIG. 1. Receiver 28 may include one or more suitable components operable to demodulate a signal according to PSK and ASK demodulation. According to the illustrated embodiment, receiver 28 includes a polarization controller 83, a polarization beam splitter (PBS) 84, a polarization controller monitor 85, an ASK demodulator 86, and a PSK demodulator 82 coupled as shown.

Polarization controller 83 sets the polarization of the PSK-ASK signal from transmitter 20 to yield orthogonal signal components. Polarization controller 83 may have any suitable setting to yield orthogonal signal components. For example, the polarization controller may be set to approximately 45 degrees. According to one embodiment, polarization controller 83 may receive instructions from polarization controller monitor 85, as described in more detail below.

Polarization beam splitter (PBS) 84 splits the PSK-ASK signal to yield two signals orthogonally polarized at 90 degrees with respect to each other, each signal to be demodulated according to a particular modulation format. In the illustrated embodiment, polarization beam splitter 84 splits the signal to yield a signal for ASK demodulation and a signal for PSK demodulation. The signal may split in any suitable manner. According to one embodiment, the signal is split into orthogonal signal components $E_x$ and $E_y$. Component $E_x$ is used as the signal for PSK demodulation, and component $E_y$ is used as the signal for ASK demodulation.

ASK demodulator 86 demodulates a signal according to ASK modulation. ASK demodulator 86 may include one or more ASK data decoders. Each ASK data decoder decodes a signal to yield particular ASK data 77. An ASK data decoder may include an a photodiode that translates the amplitude shifts to an electrical signal to yield an ASK decoded signal corresponding to ASK data 77.

PSK demodulator 82 demodulates the signal according to PSK modulation. According to one embodiment, PSK demodulator 82 may include one or more PSK data decoders. Each PSK data decoder demodulates a signal to yield particular PSK data 56. A PSK data decoder may demodulate a signal by comparing the phase shifts between successive bits. The PSK data decoder may split a received signal to yield multiple signals and delay a signal to yield a delayed signal and a non-delayed signal. The PSK data decoder may then constructively and destructively interfere the delayed and non-delayed signals to compare the phases of successive bits to yield a PSK decoded signal corresponding to PSK data 56.

Polarization controller monitor 85 may monitor the polarization of the received signal for changes that may have occurred during transmission. Polarization controller monitor 85 may send instructions to polarization controller 83 to adjust the polarization angle of the received signal to compensate any changes. An example of a polarization adjustment is described in more detail with reference to FIGS. 5A and 5B.

Figure 5A:
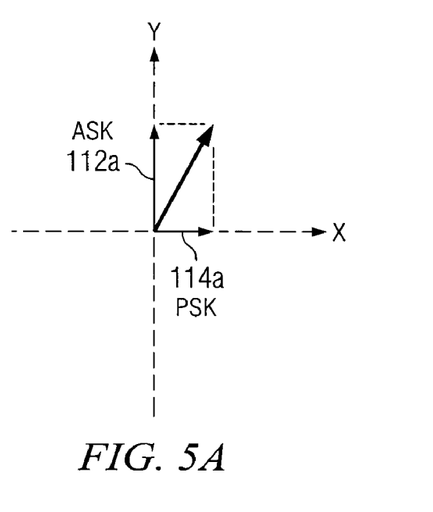
FIGS. 5A and 5B illustrate an example of power levels of a signal.
Figure 5B:
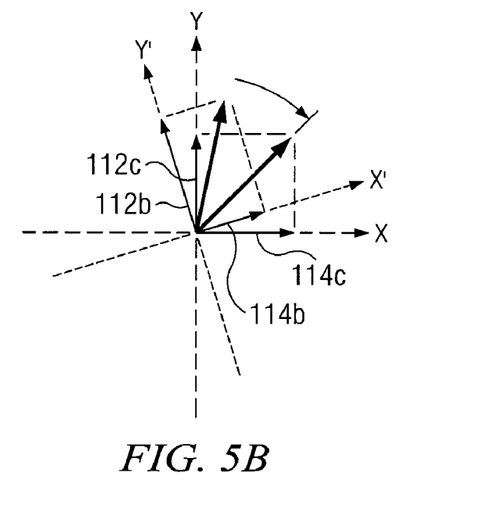

FIGS. 5A and 5B illustrate examples of power levels of a signal during communication from transmitter 20 to receiver 28. FIG. 5A illustrates the ASK power level 112a of the ASK signal and the PSK power level 114a of the PSK signal at transmitter 20. ASK power level 112a may be different from PSK power level 114a. In the example, ASK power level 112a is greater than PSK power level 114a. Power levels 112a and 114a may represent expected power levels for signals that experience no change in polarization.

FIG. 5B illustrates the power levels of the signals received at receiver 28 and after adjustment by polarization controller 23. In the example, polarization controller 23 sets the polarization angle to 45 degrees. The polarization of the signal may rotate during transmission. If polarization controller 23 does not compensate for the rotation, the rotation may change the power levels of the detected signals. In the example, ASK power level 112b and PSK power level 114b correspond to polarization rotation due to transmission. If polarization controller 23 does not correct for this polarization rotation, the detected ASK power level 112c may be less than ASK power level 112a, and the detected PSK power level 114c may be less than PSK power level 114a.

Polarization controller monitor 85 may instruct polarization controller 23 to adjust the polarization angle of the signal to compensate for the change. In this case, the adjusted signal has ASK power level 112a and PSK power level 114a. According to one embodiment, polarization controller monitor 85 may measure the power level of a received ASK signal and adjust the polarization angle setting of the polarization controller 23 in response to the measured power level. In one example, the ASK power level may be measured. A measured power level that is less than an expected power level may indicate that polarization had changed. If the measured power level is less than the expected power level, polarization controller monitor 85 may send an instruction to polarization controller 83 to adjust the polarization angle of the signal.

The polarization angle may be adjusted in any suitable direction. According to one embodiment, the polarization angle may be changed in one direction and the power level may be measured. If the power level has increased, the change may continue in that direction. If the power level decreases, the change may be made in the other direction.

Referring back to FIG. 4, polarization controller monitor 85 may measure the power level of a signal. According to one embodiment, polarization controller monitor 85 may measure the ASK power level of the ASK signal. In one embodiment, polarization controller monitor 85 may measure the power level of the ASK decoded signal, which may be an electrical signal from ASK demodulator 86. In that case, polarization controller monitor 85 may comprise current monitor. In another embodiment, polarization controller monitor 85 may measure the ASK encoded signal, which may be an optical signal prior to decoding by ASK demodulator 86. In that case, polarization controller monitor 85 may comprise a photodiode.

Modifications, additions, or omissions may be made to receiver 28 without departing from the scope of the invention. The components of receiver 28 may be integrated or separated according to particular needs. Moreover, the operations of receiver 28 may be performed by more, fewer, or other devices. Additionally, operations of receiver 28 may be performed using any suitable logic.

Figure 6:
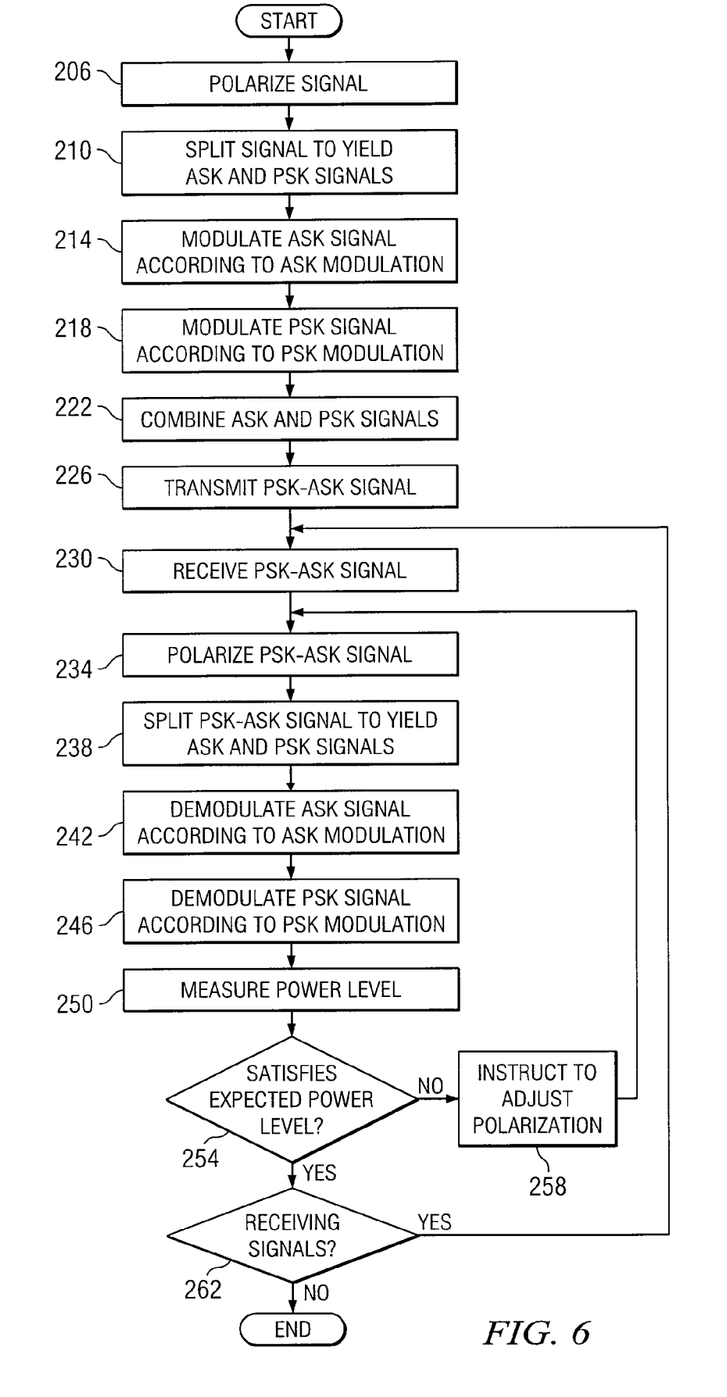
FIG. 6 illustrates one embodiment of a method for communicating a signal according to ASK and PSK modulation.

FIG. 6 illustrates one embodiment of a method for communicating a signal according to ASK and PSK modulation. The method may be performed by system 10 of FIG. 1.

The method begins at step 206, where polarization controller 23 sets polarization of a signal at a specific angle. Polarization controller 23 may set the polarization angle to 45 degrees to yield orthogonal signal components. A polarization beam splitter 25 splits the signal at step 210 to yield the orthogonal signal components comprising an ASK signal for ASK modulation and a PSK signal for PSK modulation.

ASK modulator 26 modulates the ASK signal according to ASK modulation at step 214 to encode ASK data 77. PSK modulator 24 modulates the PSK signal according to PSK modulation step 218 to encode PSK data 56. A polarization beam combiner combines the ASK signal and the PSK signal at step 222 to yield a PSK-ASK signal. Transmitter 20 transmits the PSK-ASK signal at step 226.

Receiver 28 receives the PSK-ASK signal at step 230. Polarization controller 83 polarizes the signal at step 234. Polarization beam splitter 84 splits the signal at step 238 to yield orthogonal signal components comprising the ASK signal for ASK demodulation and the PSK signal for PSK demodulation. ASK demodulator 86 demodulates the ASK signal according to ASK modulation at step 242 to yield ASK data 77. PSK demodulator 82 demodulates the PSK signal according to PSK modulation at step 246 to yield PSK data 56.

Polarization controller monitor 85 measures the power level of the ASK signal at step 250. Polarization controller monitor 85 may measure the ASK encoded signal or the ASK decoded signal. The measured power levels may be approximately the same as expected power levels at step 254. If they are not as expected, the method proceeds to step 258, where polarization controller monitor 85 instructs polarization controller 83 to adjust the polarization angle. The method then returns to step 234, where polarization controller 83 polarizes the signal. If the measured power values are as expected at step 254, the method proceeds to step 262.

Signals may be continued to be received at step 262. If signals continue to be received, the method returns to step 230, where the signals are received. If no more signals are received, the method terminates.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that a transmitter may modulate a first signal using a first modulation format and a second signal using a second modulation format, where the first signal is orthogonally polarized with respect to the second signal. The signals may then be combined for transmission. Encoding orthogonally polarized signals using different modulation formats may reduce crosstalk between the resulting encoded signals, and may also reduce dependence of the extinction ratio of one modulation format on the extinction ratio of the other modulation format.

Another technical advantage of one embodiment may be that the first modulation format may refer to PSK modulation, and the second modulation format may refer to ASK modulation. Accordingly, difficulties associated with PSK-ASK communication may be reduced.

Another technical advantage of one embodiment may be that a receiver may include a polarization controller monitor that monitors polarization of the signal received from the transmitter. In the embodiment, the polarization controller monitor may measure a power level of one of the signals. If the measured power is less than an expected power, the polarization angle of the received signal may be adjusted.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A transmitter modulator operable to modulate a plurality of signals according to multiple modulation formats, comprising:
    a transmitter polarization controller operable to polarize a signal;
    a polarization beam splitter operable to split the polarized signal to yield a first signal and a second signal, the first signal orthogonally polarized with respect to the second signal;
    a first modulator operable to encode the first signal according to a first modulation format;
    a second modulator operable to encode the second signal according to a second modulation format, wherein the first modulation format is different than the second modulation format; and
    a polarization beam combiner coupled to the first modulator and the second modulator and operable to combine the first signal and the second signal for transmission.

2. The transmitter modulator of claim 1, wherein the first modulation format refers to phase-shift keying (PSK) modulation.

3. The transmitter modulator of claim 1, wherein the second modulation format refers to amplitude-shift keying (ASK) modulation.

4. A method for modulating a plurality of signals according to multiple modulation formats, comprising:
    polarizing a signal;
    splitting the polarized signal to yield a first signal and a second signal, the first signal orthogonally polarized with respect to the second signal;
    encoding the first signal according to a first modulation format;
    encoding the second signal according to a second modulation format, wherein the first modulation format is different than the second modulation format; and
    combining the first signal and the second signal for transmission.

5. The method of claim 4, wherein the first modulation format refers to phase-shift keying (PSK) modulation.

6. The method of claim 4, wherein the second modulation format refers to amplitude-shift keying (ASK) modulation.

7. A system for modulating a plurality of signals according to multiple modulation formats, comprising:
    means for polarizing a signal;
    means for splitting the polarized signal to yield a first signal and a second signal, the first signal orthogonally polarized with respect to the second signal;
    means for encoding the first signal according to a first modulation format;
    means for encoding the second signal according to a second modulation format, wherein the first modulation format is different than the second modulation format; and
    means for combining the first signal and the second signal for transmission.

8. A transmitter modulator operable to modulate a plurality of signals according to multiple modulation formats, comprising:
- a transmitter polarization controller operable to polarize a signal;
- a polarization beam splitter coupled to the transmitter polarization controller and operable to split the polarized signal to yield the first signal and the second signal, the first signal orthogonally polarized with respect to the second signal;
- a first modulator operable to encode the first signal according to a first modulation format, the first modulation format referring to phase-shift keying (PSK) modulation;
- a second modulator operable to encode the second signal according to a second modulation format, the second modulation format referring to amplitude-shift keying (ASK) modulation; and
- a polarization beam combiner coupled to the first modulator and the second modulator and operable to combine the first signal and the second signal for transmission.

9. A receiver demodulator operable to demodulate a signal modulated according to multiple modulation formats, comprising:
- a polarization beam splitter operable to split a signal to yield a first signal and a second signal, the first signal encoded according to a first modulation format, the second signal encoded according to a second modulation format, the first signal orthogonally polarized with respect to the second signal;
- a first demodulator coupled to the polarization beam splitter and operable to decode the first signal according to the first modulation format;
- a second demodulator coupled to the polarization beam splitter and operable to decode the second signal according to the second modulation format, wherein the first modulation format is different than the second modulation format; and
- a receiver polarization controller monitor operable to measure a power level corresponding to the second signal and initiate adjustment of polarization angle of the signal in accordance with the power level if the measured power level is less than an expected power level.

10. The receiver demodulator of claim 9, wherein the first modulation format refers to phase-shift keying (PSK) modulation.

11. The receiver demodulator of claim 9, wherein the second modulation format refers to amplitude-shift keying (ASK) modulation.

12. A method for demodulating a signal modulated according to multiple modulation formats, comprising:
- splitting a signal to yield a first signal and a second signal, the first signal encoded according to a first modulation format, the second signal encoded according to a second modulation format, the first signal orthogonally polarized with respect to the second signal;
- decoding the first signal according to the first modulation format;
- decoding the second signal according to the second modulation format, wherein the first modulation format is different than the second modulation format; and
- measuring a power level corresponding to the second signal and initiating adjustment of polarization angle of the signal in accordance with the power level if the measured power level is less than an expected power level.

13. The method of claim 12, wherein the first modulation format refers to phase-shift keying (PSK) modulation.

14. The method of claim 12, wherein the second modulation format refers to amplitude-shift keying (ASK) modulation.

15. A system for demodulating a signal modulated according to multiple modulation formats, comprising:
- means for splitting a signal to yield a first signal and a second signal, the first signal encoded according to a first modulation format, the second signal encoded according to a second modulation format, the first signal orthogonally polarized with respect to the second signal;
- means for decoding the first signal according to the first modulation format;
- means for decoding the second signal according to the second modulation format wherein the first modulation format is different than the second modulation format; and
- means for measuring a power level corresponding to the second signal and initiating adjustment of polarization angle of the signal in accordance with the power level if the measured power level is less than an expected power level.

16. A receiver demodulator operable to demodulate a signal modulated according to multiple modulation formats, comprising:
- a polarization beam splitter operable to split a signal to yield a first signal and a second signal, the first signal encoded according to a first modulation format, the first modulation format referring to phase-shift keying (PSK) modulation, the second signal encoded according to a second modulation format, the second modulation format referring to amplitude-shift keying (ASK) modulation, the first signal orthogonally polarized with respect to the second signal;
- a first demodulator coupled to the polarization beam splitter and operable to decode the first signal according to the first modulation format;
- a second demodulator coupled to the polarization beam splitter and operable to decode the second signal according to the second modulation format; and
- a receiver polarization controller monitor operable to:
  - measure a power level corresponding to the second signal; and
  - if the measured power level is less than an expected power level corresponding to the second signal, then initiate adjustment of polarization angle of the signal.

17. A system operable to communicate according to multiple modulation formats, comprising:
- a transmitter modulator operable to modulate a first signal and a second signal according to multiple modulation formats, comprising:
  - a transmitter polarization controller operable to polarize a signal;
  - a polarization beam splitter coupled to the transmitter polarization controller and operable to split the polarized signal to yield the first signal and the second signal, the first signal orthogonally polarized with respect to the second signal;
  - a first modulator operable to encode the first signal according to a first modulation format, the first modulation format referring to phase-shift keying (PSK) modulation;
  - a second modulator operable to encode the second signal according to a second modulation format, the second modulation format referring to amplitude-shift keying (ASK) modulation; and a polarization beam combiner coupled to the first modulator and the second modulator and operable to combine the first signal and the second signal for transmission; and a receiver demodulator operable to demodulate a received signal modulated according to multiple modulation formats, comprising:

a polarization beam splitter operable to split the received signal to yield the first signal and the second signal, the first signal orthogonally polarized with respect to the second signal;

a first demodulator coupled to the polarization beam splitter and operable to decode the first signal according to the first modulation format;

a second demodulator coupled to the polarization beam splitter and operable to decode the second signal according to the second modulation format; and a receiver polarization controller monitor operable to:

measure a power level corresponding to the second signal; and if the measured power level is less than an expected power level corresponding to the second signal, then initiate adjustment of polarization angle of the signal.

* * * * *